(12) United States Patent
Kryzak (10) Patent No.: US 6,322,257 B1
(45) Date of Patent: Nov. 27, 2001

(54) OPTICAL ARRAY CHIP PACKAGES WITH PASSIVE ALIGNMENT FEATURES

(75) Inventor: Charles J. Kryzak, Mendota Heights, MN (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 09/779,534

(22) Filed: Feb. 9, 2001

(51) Int. Cl.$^7$ ............................... G02B 6/00; G02B 6/36
(52) U.S. Cl. ............................................................ 385/88
(58) Field of Search ........................ 385/88–90, 147; 257/700, 706; 438/119, 15, 4; 156/94; 29/840

(56) References Cited

U.S. PATENT DOCUMENTS

| | | | |
|---|---|---|---|
| 5,757,073 | * 5/1998 | Hoffmeyer | 250/700 |
| 6,056,448 | 5/2000 | Stevens et al. | |
| 6,104,988 | * 8/2000 | Klarer | 702/183 |
| 6,134,776 | * 10/2000 | Hoffmeyer | 29/840 |
| 6,169,663 | * 1/2000 | Garcia | 361/760 |

* cited by examiner

Primary Examiner—Akm E. Ullah
(74) Attorney, Agent, or Firm—Patrick M. Hogan; Glenn W. Bowen (57) ABSTRACT

An adhesive layer is applied to the surface of a flat, transparent flexible circuit that contains electrically conductive traces one, or more, electronic components is secured by the adhesive layer to the flexible circuit. A dam is formed that encircles at least a substantial portion of the component. A potting material fills the dam such that it encapsulates at least a substantial portion of the component. At least one via is provided in the flexible circuit and the adhesive layer in which electrically conductive material forms an electrical connection to the component. Additional vias are formed in the flexible circuit and the adhesive layer as required to make electrical connections to the traces of the flexible circuit. The component may be secured to a heat sink and the potting fill material may be removed to that it does not entirely cover the surface of the heat sink so that the surface of the heat sink that is remote from the component allows heat to escape into the surrounding environment. Additional flexible circuits may be secured to the first flexible circuit layer, and additional vias with electrically conductive material may be used to connect to the electrically conductive traces of the same, or different layers. The assembly is particularly advantageous for optical components wherein the flexible circuit is positioned adjacent the optical component and allows optical signals to be transmitted through the flexible circuit.

10 Claims, 7 Drawing Sheets

OPTICAL ARRAY CHIP PACKAGES WITH PASSIVE ALIGNMENT FEATURES

BACKGROUND OF THE INVENTION

The field of the invention is the optical packaging of laser and detector array, and in particular, the packaging of such arrays in a manner which allows them to be passively aligned accurately, so that the optical ports in the detector arrays are accurately aligned with optical fibers and input connectors.

The use of high frequency electrical-to-optical component interfaces is becoming more prevalent. One of the major problems with this type of interface, is the alignment of the optical device ports connected to optical fibers in connectors. Prior attempts to solving this problem required that special contacts and metalized features be designed into the optical chips and wire bonding, or lead frame, contacts were commonly made to the die. In addition, prior designs did not allow the user to conveniently change the plane or the orientation of the optical signal relative to the electrical signal. Other problems that existed in many of these designs were the difficulty of obtaining a predictable and reproducible separation between the emitter or detector aperture and the fiber-end coupling while maintaining high reliability under harsh, thermal, vibration, and shock environments, which increased the optical coupling losses are associated with beam divergence.

The instant invention allows for interface components such as laser array and detector array components to be passively and concurrently aligned with the fibers of a flexible optical fiber strip. For example, MT optical fiber array connectors may be employed, as shown in U.S. Pat. No. 6,056,448 issued May 2, 2000, entitled "*Vertical Cavity Surface Emitting Laser Array Packaging*" which is assigned to the assignee of this invention. The invention also accommodates high frequency impendance matching, and electrical-to-optical component connection through the use of precision flexible optical fiber strips The optical chips are protected by encapsulation on three sides and the optically active side being covered with the flex lamination itself. Protection of optical components with a flex circuit in an optical package, is shown in opening application Ser. No. 09/536,808 entitled "*Passive Self-Alignment Technique for Array Laser Transmitters*" filed by the assignee of this invention. Heat sinks can also be placed on the optical chips and exposed through encapsulation material. It also disclose an optical array chip with passive alignment in which a flexible lead sheet of a polymeric material was positioned between the optical ports of a laser or detector array and the input fibers from a connector that is connected to the package. The flexible sheet abutted against the upper ports and the fiber upper ends of the connector, so as to provide protection for them. In addition, the flexible sheet could be made of a expanded thickness in order to provide a predetermined amount of separation between the optical ports and the fiber ends. In this manner, it would allow for the control of optical transmission characteristics such as optical coupling losses and beam divergence, in addition to providing the protection for high reliability under harsh, thermal, vibration shock environments. Optical coupling was achieved by transmission of optical signals from the connectors through the flexible circuit, which may, or may not, have holes provided in it, according to the desired optical transmission characteristics.

Figure 11:
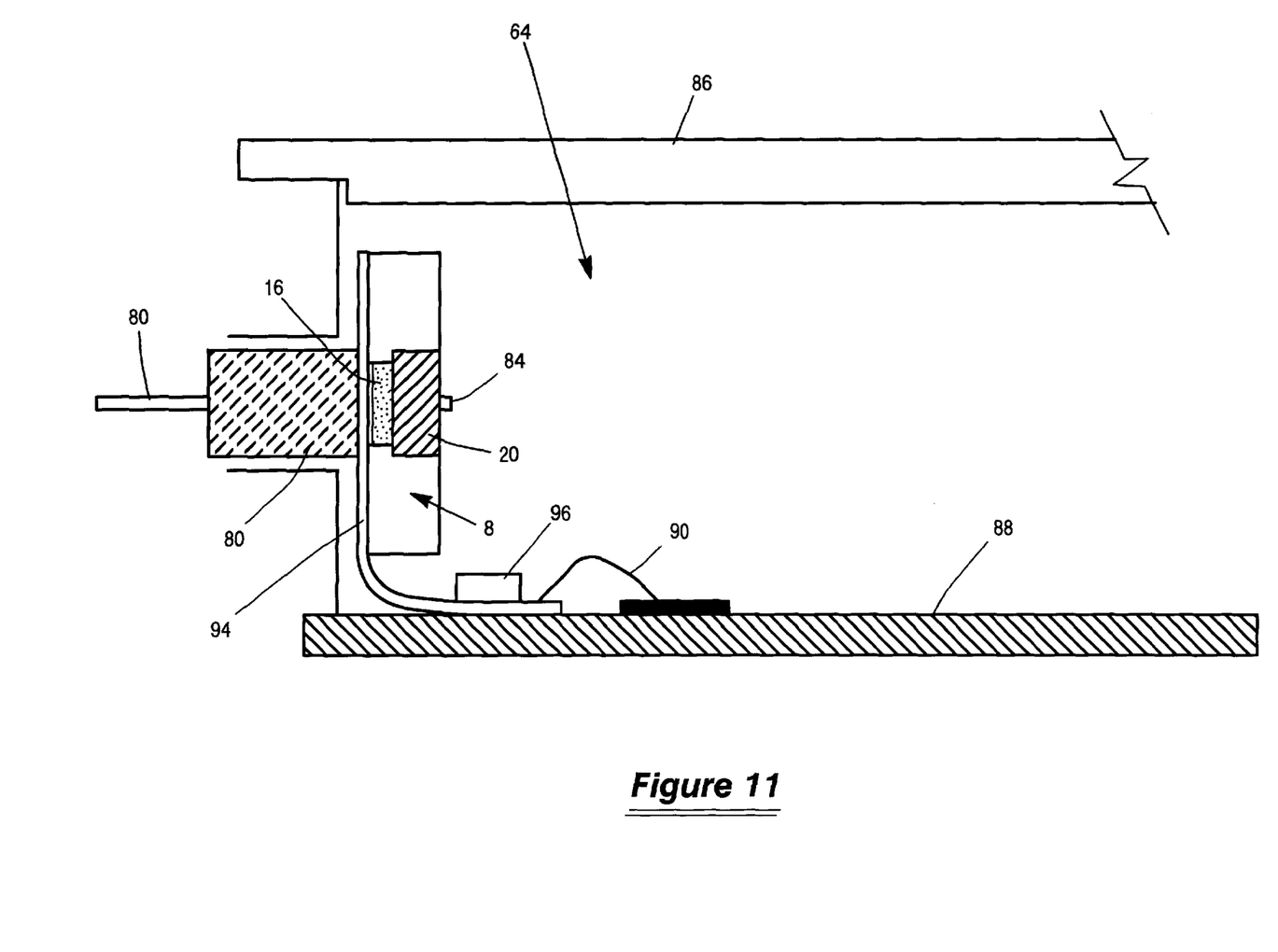
FIG. 11 is a cross-sectional view of FIG. 10 which shows how the flex circuit, the optical fiber array connector, and the other components of the optical package may be positioned and connected.

The present invention utilizes this same form of passive optical alignment, but provides additional advantageous features, wherein the optical component is protected with encapsulation, in addition to the protection provided by the flexible circuits. The optical array package of this invention also requires no special contacts or lead frame features to be designed into the optical chip. It is fully protected on all four sides and no wire bonding, or lead frame contacts need be made directly to the die. In addition, heat sinks can be integrated into the chip package and exposed to the encapsulation. Also, if desired, a semi-conductive circuit chip 96 may also be incorporated into the package, as shown in FIG. 11, by utilizing the same processing techniques employed to attach the dies 16 and 18 to the flex circuit. The design of the optical array package is such that is suitable for low cost, high volume manufacturing, especially for applications where high frequency impendance is required.

BRIEF SUMMARY OF THE INVENTION

An electronic assembly which includes a substantially flat flexible circuit that contains electrically conductive traces at least one electronic component is secured by adhesive to the flexible circuit. A potting material fills a dam that encircles at least a substantial portion of each component vias that contain electrically conductive materials to make electrically connection to the component and to the conductive traces on the flexible circuit.

Additional layers of flex circuits may be constructed in the manner described, if required. A heat sink can be attached to the components which can emit heat through openings in the potting material fill. The electronic assembly is ideal for optical components such as receivers and transmitters, wherein said flexible circuits are positioned so they are adjacent to said components and allow optical signals to be transmitted through the flexible circuit. This is especially effective when optical connections that employ optical fibers are aligned on one side of the flexible circuit with optical ports in the electronic assembly on the other side of the flexible circuit.

BRIEF DESCRIPTION OF THE DRAWINGS

The invention is described by reference to the drawings in which.

DETAILED DESCRIPTION OF THE INVENTION

Figure 1:
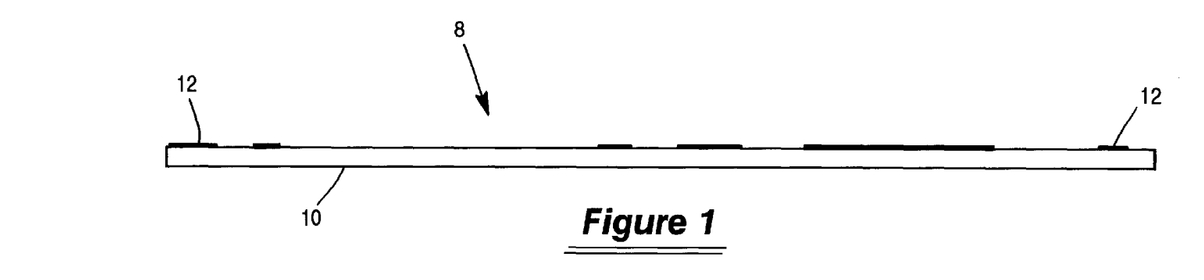
FIGS. 1 through 7 are cross-sectional views which illustrate the steps involved in constructing one embodiment of a chip-on-flex device that is constructed in accordance with the present invention.

An optical array packaging in accordance with the invention is constructed as shown in the FIGS. 1 through 11. The construction of the package begins with a pre-patterned flexible circuit 10 that includes electrically conductive traces 12 formed on it, as shown in FIG. 1.

Figure 2:
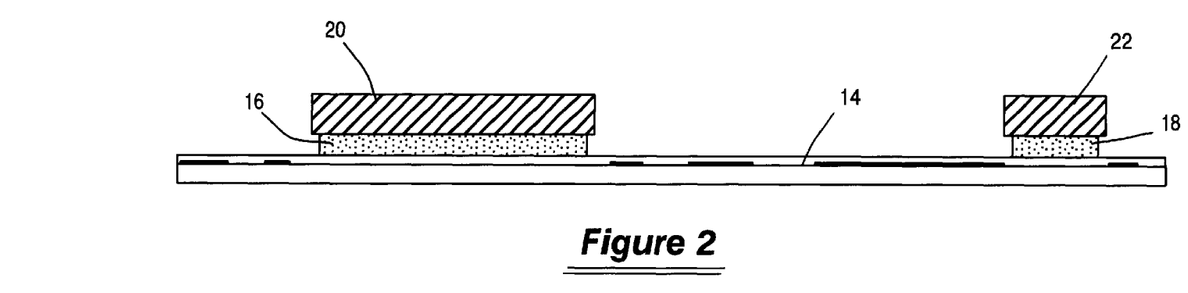
Figure 3:
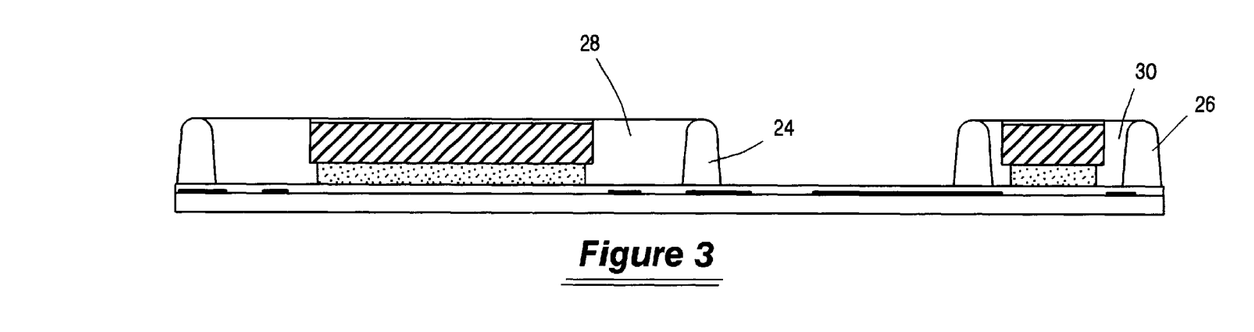

FIG. 2 shows, for the purpose of illustration, the component die 16 and the component die 18 may be secured to the flexible circuit 10 by means of an adhesive layer 14 that is applied over the conductive traces. The adhesive layer 14 bonds the die 16 and the die 18 to the flexible circuit 10. The die 16 and the die 18 may be detector elements or VCSEL elements, or other optical components. Also, the top surface of each die may be secured to a heat sink such as the heat sinks 20, 22. The component die 16 is shown in a side view and the component die 18 is shown in an end view, for purposes of illustration. The next step in constructing the package, is that a dam material is first deposited on top of the adhesive layer to form the dam 24 for the die 16 and the dam 26 for the die 18. Once the dams are formed, encapsulating protective material is poured, or deposited into, them to form the encapsulated structures 28 and 30 over the dies and the heat sinks, or shims.

Figure 4:
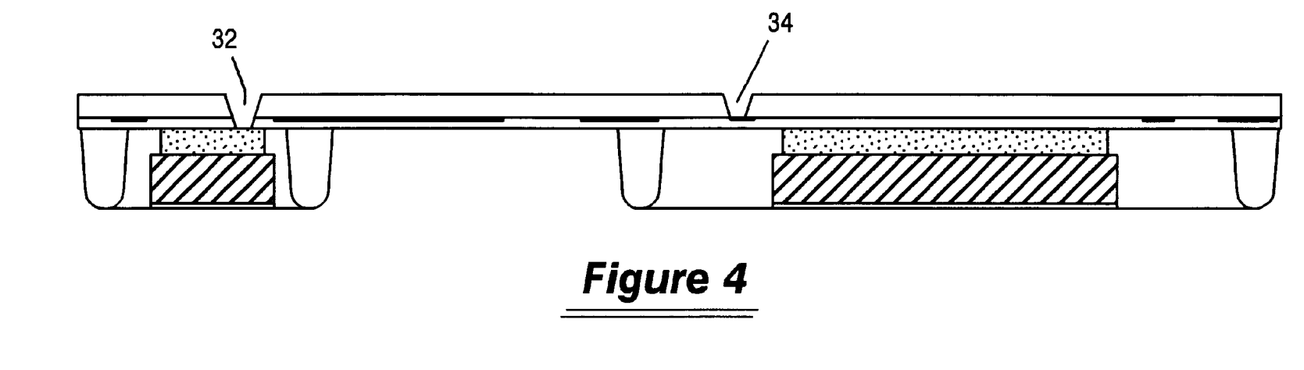
Figure 5:
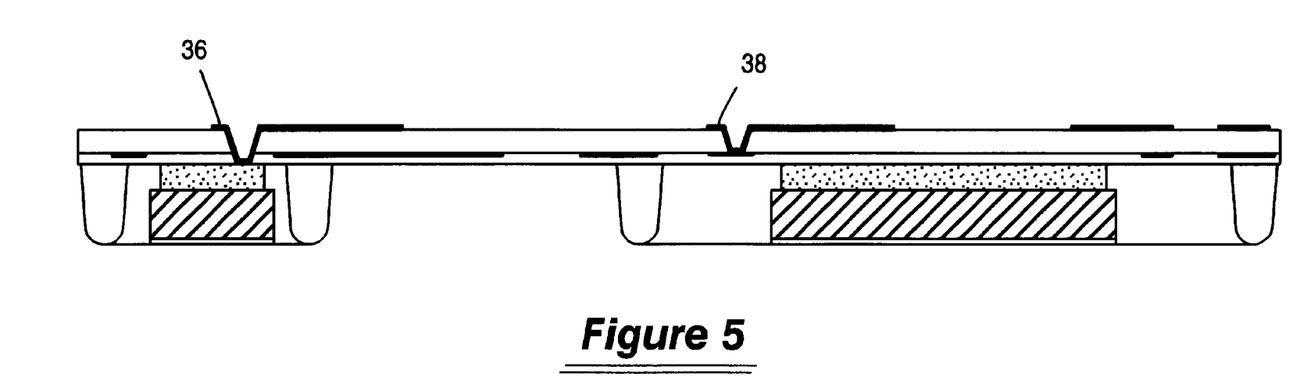

In the process shown in FIG. 4, laser drilled holes, or cavities, that run entirely, or part of the way, through the flexible circuit 10, and the adhesive layer 14 (called "vias" in this document), are located where electrical connections are to be made from the side of the flexible layer 10 that does not carry the component die 16 or the component die 18. The interior surfaces of such vias, such as 32 and 34 are then plated with electrical conductor material to form the electrical connections 36 and 38, as shown in a FIG. 5, in order to make a plated via connection.

Figure 6:
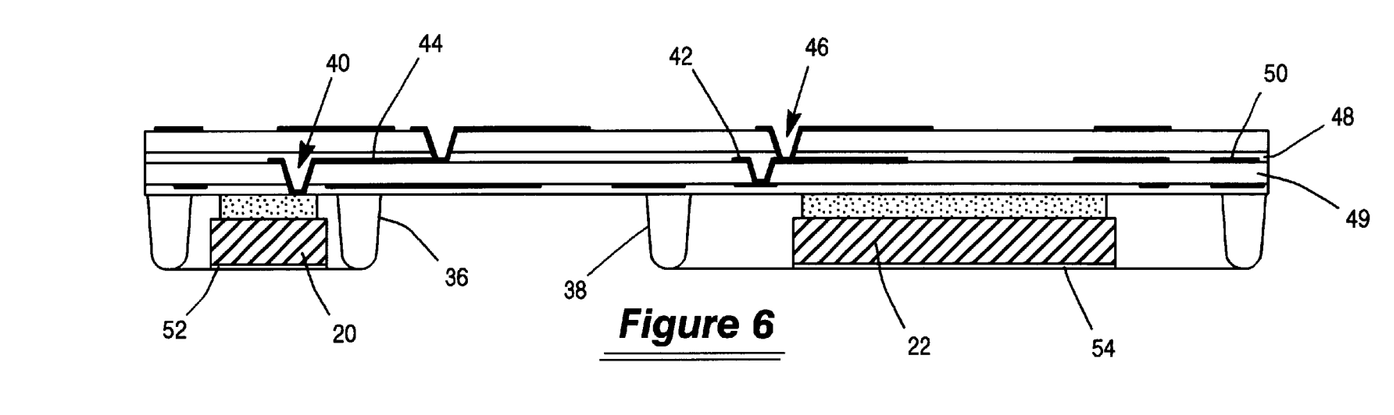

FIG. 6 shows how additional interconnecting layers, if desired, may be incorporated into this type of device. The second lower interconnect substance 49, may be made with the same construction methods as the top layer substance 10 with conductive traces 50 secured to it by an adhesive layer 48. Vias 40 and 42 are provided with additional connections 44 and 46. The connections 44 and 46 may then make connection to the upper level connections 36 and 38. In order to provide an opening for the heat sinks 20 and 22 to allow heat to escape from the chip package, the potting compound in the area 52, adjacent to heat sink 20 and the area 54 adjacent to heat sink 22, may be removed.

Figure 7:
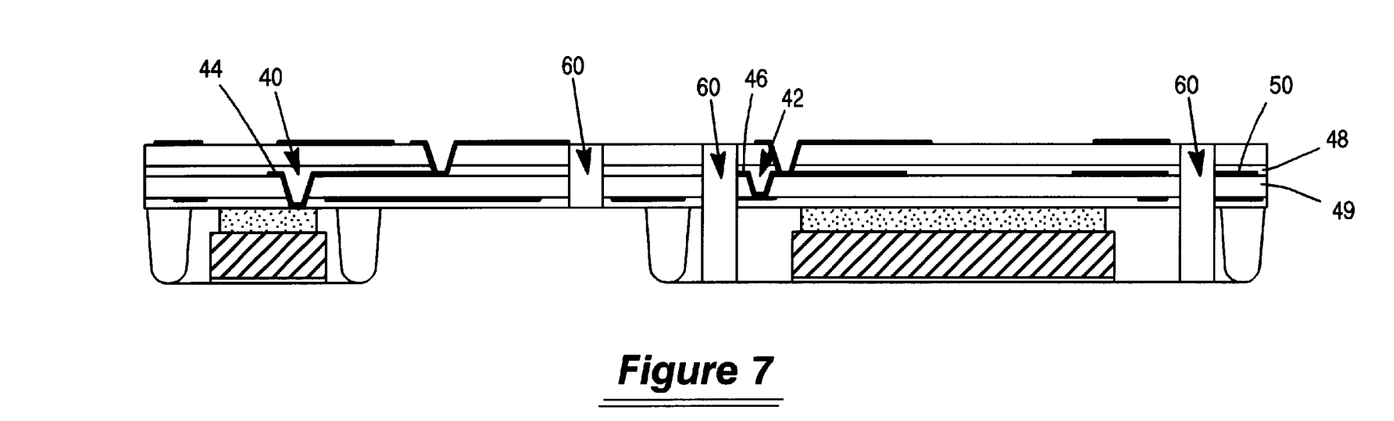

FIG. 7 shows the next step in the process in which holes 60 are cut through the chip package. They may be drilled, either by mechanical drilling, or preferably, by laser drilling to allow for the alignment of the fiber ends in the connection, which may be conventional MT connectors.

Figure 8A:
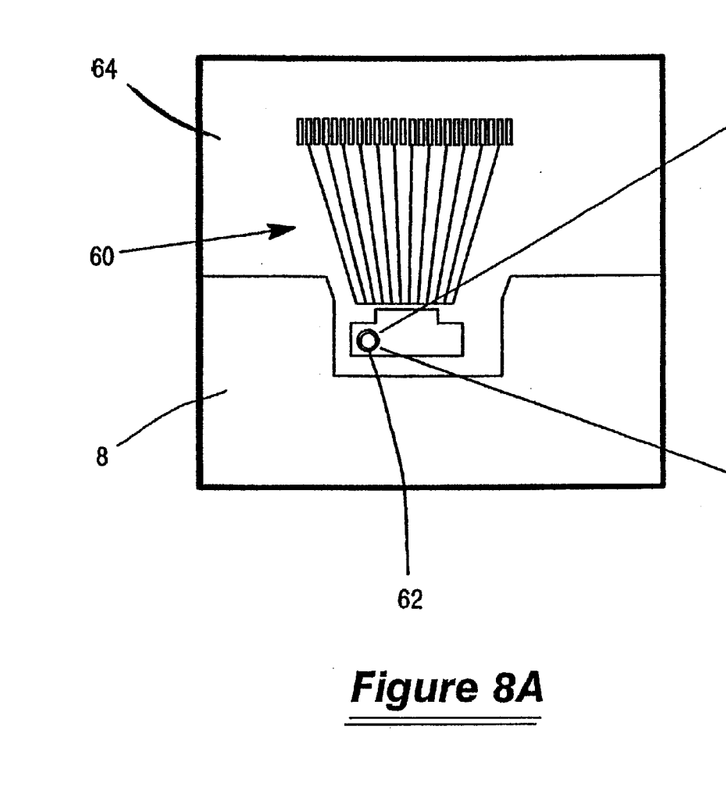
FIG. 8 is a top view of an optical array connection and a flexible optical fiber circuit that are aligned by employment of an alignment pin.
Figure 8B:
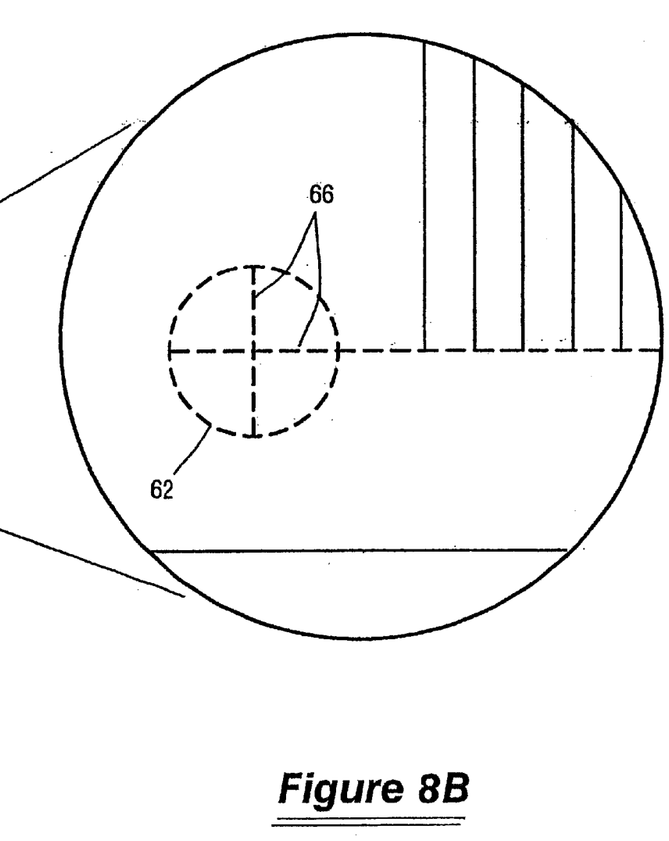
Figure 9:
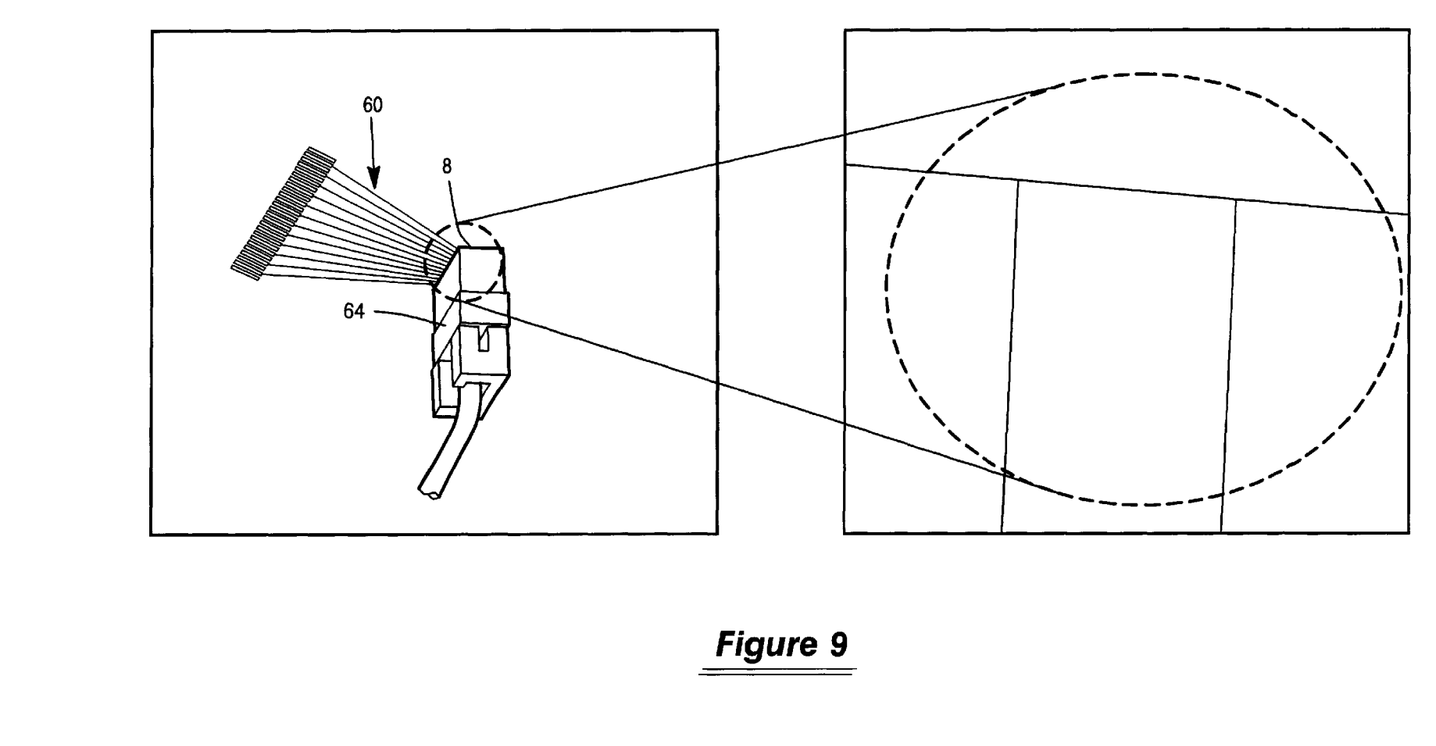
FIG. 9 is a side view of an assembly of the optical array connection and the flexible optical fiber circuit strip, which shows the manner in which proximity of the connector and the strip are maintained.

FIG. 8 illustrates an electrical to optical interface alignment feature of the package of the invention. A flexible cable 60 from the chip package extends through, and expands outward from the connector 64. One, or more of the holes that have been formed in step 7 of FIG. 7, such as the hole 62, may be used for alignment with an optical fiber connector. Cross-hairs 66 shown in the expanded view of FIG. 8 may be employed to obtain a high degree of relative alignment between the center of the pin hole and the VCSEL apertures. Initial 1×12 VCSEL aperture-to-pin alignment accuracy is estimated at 3 to 5 microns, and with an Eximer laser drill processing, an alignment resolution of not more than 5 microns may be possible. Another advantage of the package of the present invention, is shown in FIG. 9, where the fiber connector assembly maintains a fixed amount of separation between the connector 64 and the optical array package 8.

Figure 10:
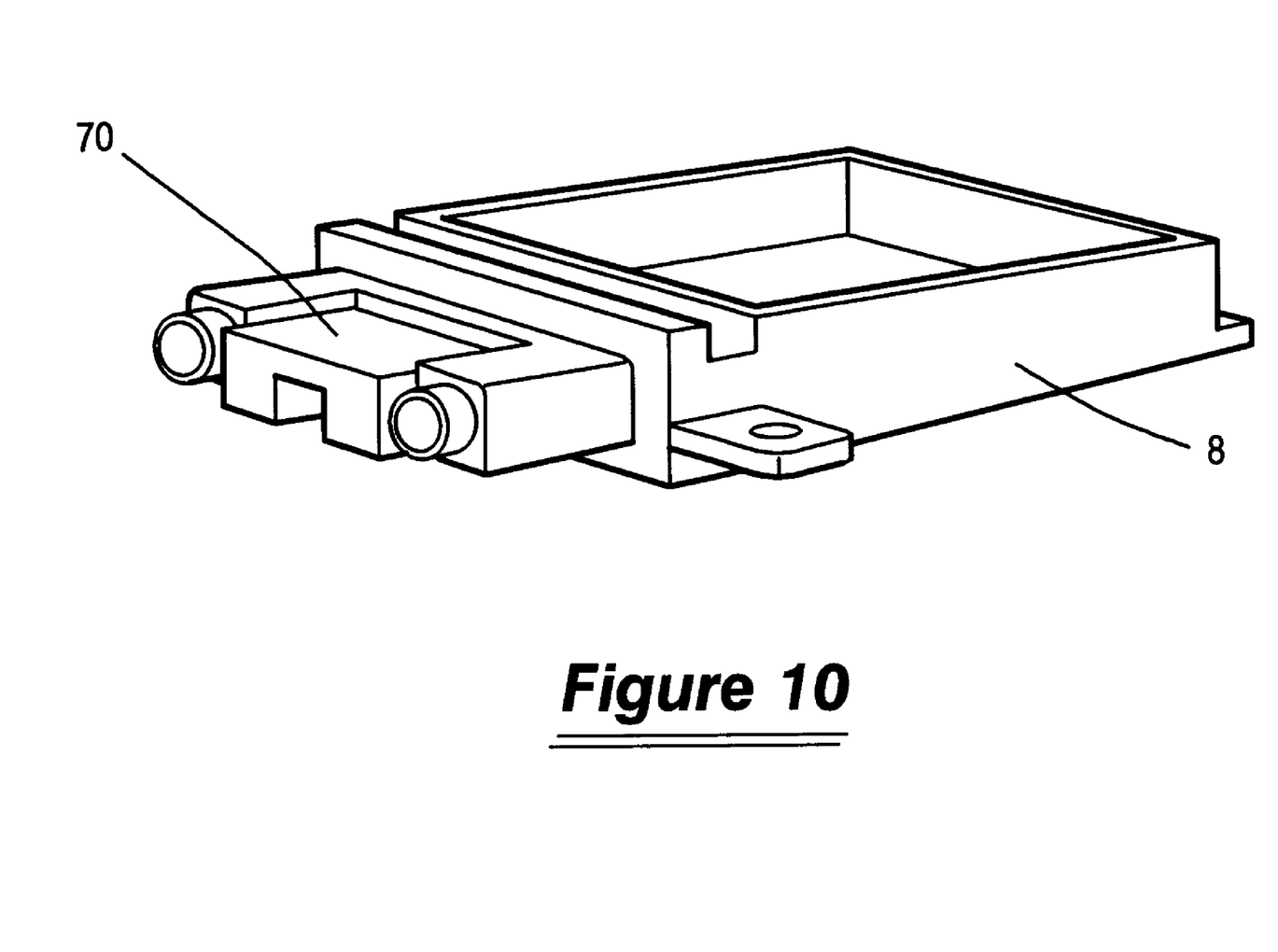
FIG. 10 is a perspective view of a housing that shows an array connector coupled to the housing which contains a circuit board that houses the optical receiver and/or optical transmitter components and the flex circuit.

FIG. 10 shows in a cross-sectional side view, how the alignment is achieved for the fiber optic ends (not shown) from the fiber optic cable 80 that runs into the optical connector 82. The connector projects into the housing for the optical package 64. Alignment pins like the pin 84, help to properly position the connector. Lid 86 is shown on the housing A printed wiring board 88 has a circuit bonding pad 90 secured on it. A wire or ribbon bond 90 is connected to the pad 92. A flexible circuit extension 94 of the flexible circuit in the package extends beyond the package and is connected to the wire or ribbon bond 90 to complete electrical connections. When the fiber ends (not shown) of the connector are properly aligned with the ports (not shown) of the optical device, light passes between the ports of the optical device of the optical package and the optical fiber ends. Holes may either be laser-drilled through the flex circuit, or not, as desired.

FIG. 11 illustrates a combination of an MT optical connector 70 (without a fiber cable) connected into an optical chip package 8 (with the cover removed).

I claim:

1. An electronic assembly comprising:
    a substantially flat flexible circuit having first and second substantially flat surfaces and containing electrically conductive traces on at least one of said surfaces,
    an adhesive layer on said first surface;
    at least one electronic component site which each site comprises:
        (a) an electronic component secured to said first surface by said adhesive layer which separates said component and said flexible circuit,
        (b) a dam formed on said first surface that encircles at least a substantial portion of said component,
        (c) a potting fill material in said dam that encapsulates at least a substantial portion of said component,
        (d) at least one via in said flexible circuit and said adhesive layer,
        (e) electrically conductive material in said at least one via that is electrically connected to said component, and
        (f) additional vias in said flexible circuit and said adhesive layer, and
        (g) additional electrically conductive material in said additional vias, as required, to make electrical connections to said traces to form an electronic circuit.

2. An electronic assembly as claimed in claim 1, wherein a component is secured to a heat sink and is located between said heat sink and said first surface.

3. An electronic assembly as claimed in claim 2, wherein said potting fill material does not entirely cover a surface of said heat sink that is remote from said component, so as to allow heat to escape into the surrounding environment.

4. An electronic assembly as claimed in claim 3, comprising one or more substantially flat additional flexible circuits containing substantially flat electrically conductive traces, wherein each of said additional flexible circuits, except the upper-most and lower-most flexible circuits are secured to the flexible circuit layer above and below it by additional adhesive layers, and each of said additional layers has at least one via therein which provides an electrically conductive connection to at least one of said electrically conductive traces.

5. An electronic assembly as claimed in claim 4, wherein said component is an optical translation component which translates between optical signals and electrical signals.

6. An electronic assembly as claimed in claim 5, wherein said flexible circuit is optically transparent and is positioned so that said flexible circuit is adjacent said optical translation component so as to allow optical signals to be transmitted through said flexible circuit.

7. An electronic assembly as claimed in claim 6, wherein said optical translation component is an optical signal transmitting component.

8. An electronic assembly as claimed in claim 7, wherein said optical translation component is an optical signal receiving component.

9. An electronic assembly as claimed in claim 8, wherein said electronic assembly further comprises a connection member that has a first plurality of optical ports, each of which comprises an optical fiber, and said optical translation component comprises a second plurality of optical ports, each of which comprises an optical fiber which is in alignment with one of said optical fiber of said first plurality of optical ports, and said extension of said flexible circuit is adjacent to, and separates, the optical ports of the first and second plurality of optical ports.

10. An electronic assembly as claimed in claim 9, wherein at least one via is provided that extends through the entire assembly to allow for said alignment of said optical fibers.

* * * * *

UNITED STATES PATENT AND TRADEMARK OFFICE
CERTIFICATE OF CORRECTION

PATENT NO.    : 6,322,257 B1
DATED         : November 27, 2001
INVENTOR(S)   : Charles J. Kryzak et al.

It is certified that error appears in the above-identified patent and that said Letters Patent is hereby corrected as shown below:

<u>Title page,</u>
Item [75], insert the following names after the first inventor:
--     Glenn A. Forman, Niskayuna, NY (US)
       William A. Hennessy, Rexford, NY (US)
       William P. Kornrumpf, Schenectady, NY (US) --

Signed and Sealed this

Twenty-ninth Day of October, 2002

*Attest:*

*Attesting Officer*

JAMES E. ROGAN
*Director of the United States Patent and Trademark Office*